No. 848,675. PATENTED APR. 2, 1907.
J. MURGAS.
WAVE METER.
APPLICATION FILED JAN. 29, 1906.

2 SHEETS—SHEET 1.

Witnesses
J. G. Stinkel
B. C. Rust

Inventor
Joseph Murgas
by John Freeman Watson
Attorneys

No. 848,675. PATENTED APR. 2, 1907.
J. MURGAS.
WAVE METER.
APPLICATION FILED JAN. 29, 1906.

2 SHEETS—SHEET 2.

Witnesses
J. G. Strinkel
B. C. Rust

Inventor
Joseph Murgas
By Pooler Freeman Watson
Attorneys ized conductor 16, each turn of# UNITED STATES PATENT OFFICE.

JOSEPH MURGAS, OF WILKES-BARRE, PENNSYLVANIA.

WAVE-METER.

No. 848,675.  Specification of Letters Patent.  Patented April 2, 1907.

Application filed January 29, 1906. Serial No. 298,466.

*To all whom it may concern:*

Be it known that I, JOSEPH MURGAS, a citizen of the United States, residing at Wilkes-Barre, in the county of Luzerne, State of Pennsylvania, have invented certain new and useful Improvements in Wave-Meters, of which the following is a specification.

The present invention relates to means for measuring the lengths of the waves in electric oscillation systems—as, for instance, wireless-telegraph systems—and since the determination of the wave-length involves a determination of the frequency the invention also relates to means for measuring the frequency in systems of the character described.

The object of the invention is to provide improved means for attaining the results indicated above and can be best explained in connection with its illustration in the accompanying drawings, of which—

Figure 1:
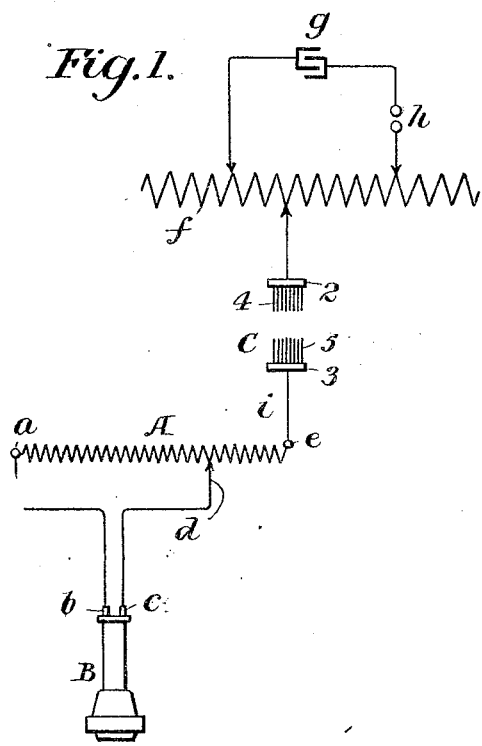
Figure 2:
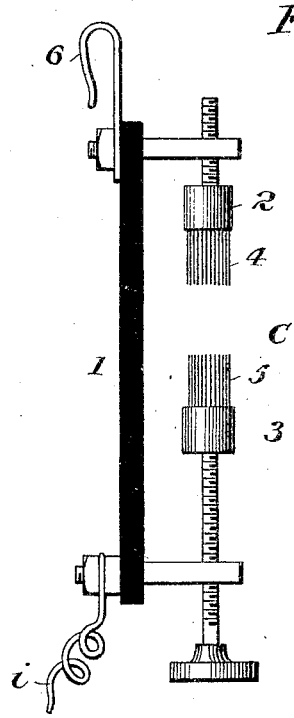
Figure 3:
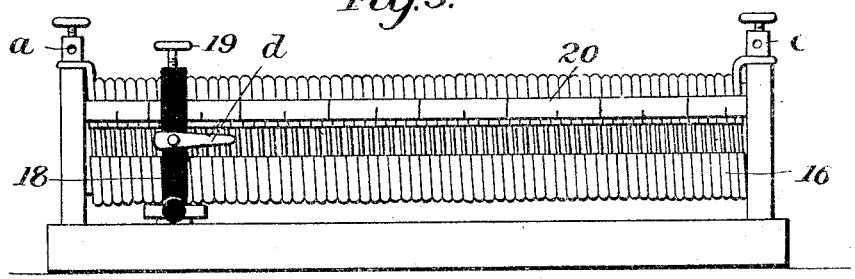
Figure 4:
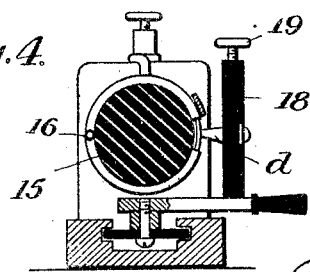
Figure 5:
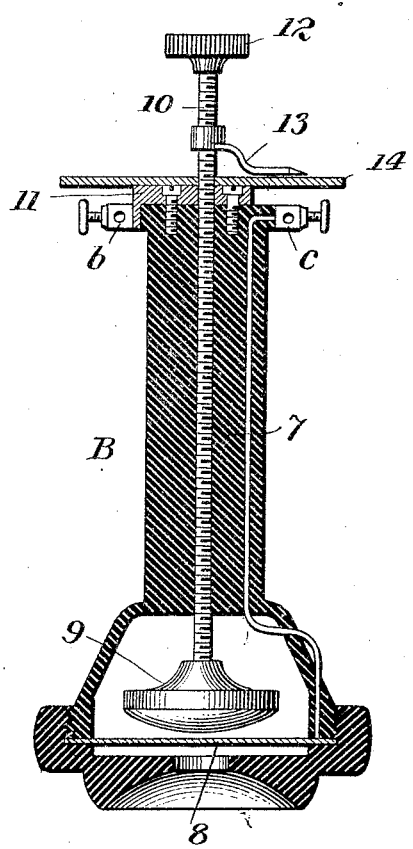
Figure 6:
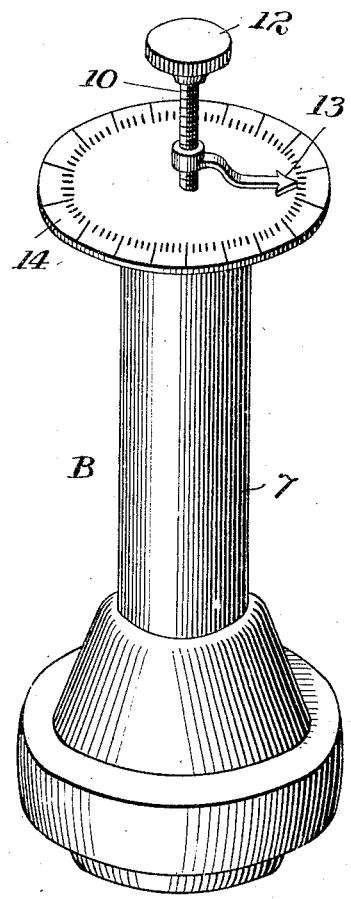

Figure 1 is a diagram of connections of the wave-meter and sufficient of the apparatus of a system to which it is applied to illustrate its application. Fig. 2 is a side view of an electrostatic means which is preferably employed for coupling the wave-meter with the system to be examined. Fig. 3 is a side elevation of the inductance-coil. Fig. 4 is a cross-section thereof. Fig. 5 is a longitudinal section of the static telephone-receiver, and Fig. 6 is a perspective view thereof.

Referring to the drawings, the apparatus comprises an inductance-coil A, to one terminal $a$ of which one terminal $b$ of an electrostatic telephone-receiver B is connected, the other terminal $c$ of the receiver having a connection with a sliding contact $d$, bearing against the turns of the coil A. The other terminal $e$ of the coil A is coupled with the system to be investigated, preferably by electrostatic means C, comprising opposed electrodes separated by a dielectric. The system to be investigated is shown, for instance, as a well-known oscillator-circuit adapted for use in a transmitter of a wireless-telegraph system and comprising an inductance $f$, a condenser $g$, and a spark-gap $h$.

Preferably the closed circuit, comprising the coil A and telephone-receiver, is coupled with the system under investigation through a conductor $i$ of considerable length, so that the said circuit will be removed from the range of the noise caused by the sparking at the gap $h$.

Referring particularly to Fig. 2, the electrostatic coupling means C, which may also be termed a "still discharger," comprises an insulating-bar 1, on which are supported the opposed electrodes 2 and 3, the opposed ends of which are each provided with a plurality of needle-like prongs 4 and 5. Preferably the electrodes are mounted so as to be adjustable with relation to each other. This may be accomplished by mounting one or both of them upon screws, as shown. One of the electrodes is connected to a hook 6, which serves to make contact with the conductor to be examined, while the other electrode is connected with one terminal of the coil A by means of the wire $i$.

The telephone-receiver (see Fig. 5) may have the usual insulating-body 7, supporting the usual diaphragm 8, which constitutes one of the electrodes or plates of a condenser and is electrically connected to a terminal $c$. The other electrode or plate 9 of the condenser is secured to a screw 10, rotatably mounted and adapted to engage with screw-threads in a metal plate 11, fixed to the body and forming an electrical connection between the electrode 9 and the terminal $b$. The outer end of the screw is provided with a knurled head of insulating material 12 for convenience in turning. For indicating the angular position of the screw a pointer 13 is secured to the screw, and its position may be read upon an adjacent suitably-graduated dial 14, secured to the telephone-body. The pitch of the screw being known, the separation of the electrodes can be ascertained from the position of the screw with the aid of the pointer and dial. The distance of the electrodes being known, the capacity of the device as a condenser can be readily ascertained by calculation in a well-known way. Not only does this instrument act as a condenser, but the diaphragm is vibrated as the charges pass electrostatically from the diaphragm to the other electrode and emits a sound which is louder as the charges are stronger, and therefore a condition of resonance exists when the sound is loudest.

The inductance-coil A (see Fig. 3) comprises a suitably-supported core 15, of insulating material, on which is wound a continuous insulated conductor 16, each turn of which has a bared portion, as shown, so that a sliding contact $d$ may contact successively with them as it is moved longitudinally of the coil. The contact $d$ is mounted upon an insulating sliding carriage 18, which also carries a terminal 19 for effecting connection with the contact $d$. To the ends of the coil the terminals $a$ and $e$ are connected, and adjacent to the bared portions of the turns a scale 20 is located, the said scale having a graduation opposite each turn and calibrated to read the number of turns from one end of the coil. By observing the turn in contact with the slider and its adjacent graduation the number of turns included between the slider and one end of the coil—that is, the number of turns in the closed circuit—can be directly read.

From the foregoing it will be seen that in the apparatus shown the electrostatic telephone-receiver, which is also a condenser, and the inductance-coil are connected in a closed circuit which is coupled electrostatically with the system which is to be examined. The intensity of the charges passing to the closed circuit can be regulated by adjusting the separation of the electrodes of the electrostatic coupling means.

The period of the closed circuit depends upon its constants, inductance, and capacity, and as for a given adjustment of the telephone-receiver electrodes, read as before described, the capacity is readily ascertained, and from the number of turns of the inductance-coil the inductance may readily be found. The period or frequency can then be calculated in a well-known manner. If the closed circuit is in resonance with the system to be investigated, they will, from the definition, have the same period, and from the known period of the system the wave length can be ascertained by well-known calculation, which it is unnecessary to detail here.

The closed circuit is adjusted to resonance with the system to be examined by varying the capacity of the electrostatic telephone-receiver and the number of turns of inductance included in the circuit, or both, and when the resonant condition is reached the receiver emits its loudest sounds. Readings are then taken, as before described, and the desired results calculated.

While the invention has been illustrated in what is considered its best structure, it may be embodied in other structures and should not, therefore, be limited to that shown.

What I claim is—

1. In a wave-meter, the combination with a closed circuit adapted to have its period varied, of means for indicating the constants of the circuit for each adjustment, means for indicating a resonant condition of the circuit, and electrostatic means external to the said circuit for coupling said circuit with the system, the waves of which are to be measured.

2. In a wave-meter, the combination with a closed circuit adapted to have its period varied, of means for indicating the constants of the circuit for each adjustment, means for indicating a resonant condition of the circuit, and opposed electrodes external to the said circuit for coupling the said circuit with the system, the wave length of which is to be measured, each of said electrodes comprising a plurality of projecting prongs.

3. In a wave-meter, the combination with a closed circuit adapted to have its period varied and comprising an electrostatic telephone-receiver for indicating a resonant condition of the circuit, of means for indicating the constants of the circuit for each adjustment, and electrostatic means for coupling said circuit with the system, the wave length of which is to be measured.

4. In a wave-meter, the combination with a closed circuit adapted to have its period varied and comprising an electrostatic telephone-receiver for indicating a resonant condition of the circuit, of means for indicating the constants of the circuits for each adjustment, and electrostatic means for coupling said circuit with the system, the wave length of which is to be measured, the said electrostatic means comprising opposed electrodes, each having a plurality of projecting prongs.

5. In a wave-meter comprising a closed circuit including an adjustable reactance-coil calibrated to indicate the turns of the coil included in the circuit, and an electrostatic telephone-receiver having adjustable electrodes and calibrated to indicate the distance of separation of its electrodes.

6. In a wave-meter, the combination with a closed circuit adapted to have its period varied and including an inductance and an electrostatic telephone-receiver, of electrostatic means for coupling said circuit with the system, the wave length of which is to be measured, said electrostatic means comprising opposed electrodes adapted to be adjusted with relation to each other.

In testimony whereof I affix my signature in presence of two witnesses.

JOSEPH MURGAS.

Witnesses:
M. H. McANIFF,
J. F. McCABE.